3,412,598
IMPACT TESTING MACHINE
James E. Webb, Administrator of the National Aeronautics and Space Administration with respect to an invention of Carl Edward Johnson, Arlington, Va.
Filed Dec. 23, 1965, Ser. No. 516,152
1 Claim. (Cl. 73—12)

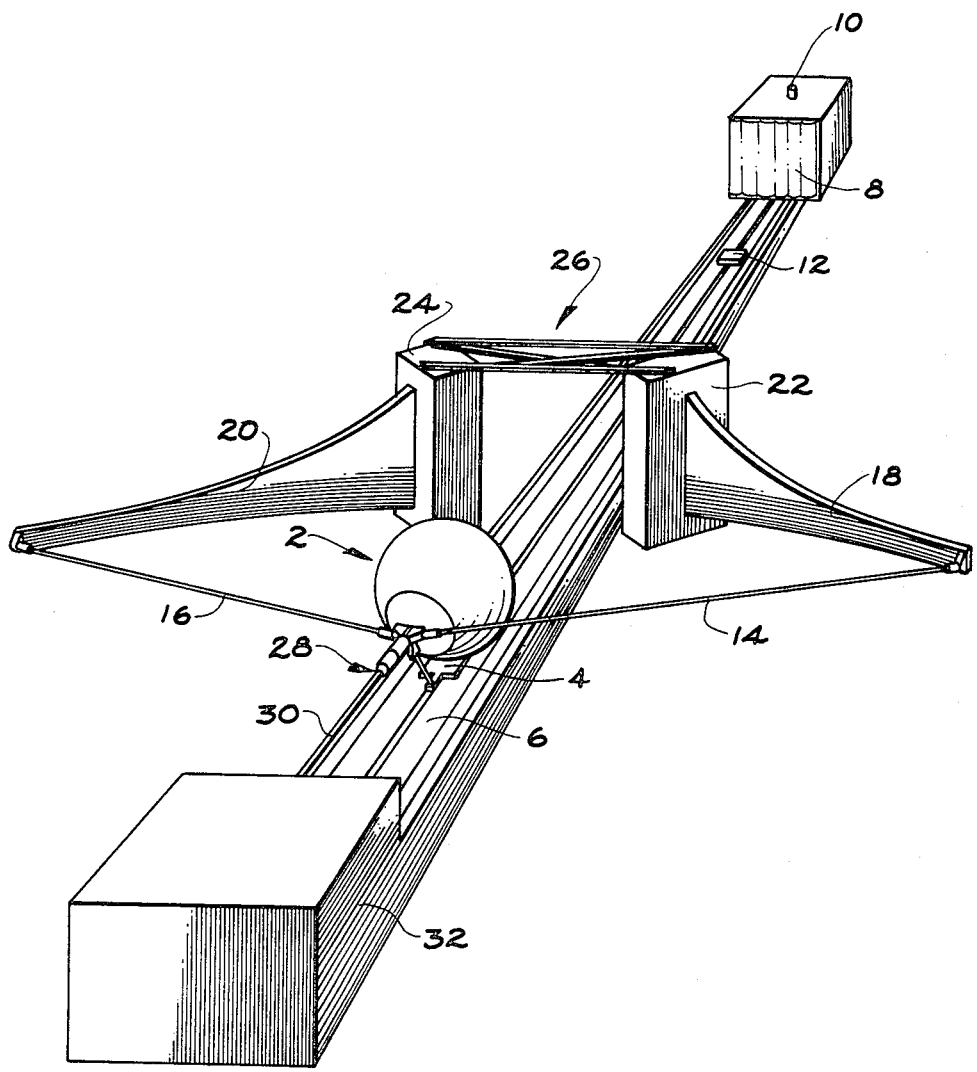

ABSTRACT OF THE DISCLOSURE

A pair of bow limbs are positioned on either side of a track and a bow line attached to the outer ends of the limbs is attached to a carriage which rides on the track for carrying a test package. A source of power draws the bow line against the bias of the bow limbs and a quick release mechanism release the power source from the bow so that the carriage and package are propelled at high velocity toward an impact receiving surface. A stop halts movement of the carriage short of the impact receiving surface and the package continues in free flight to impact the surface.

Origin of the invention

The invention described herein was made in the performance of work under a NASA contract and is subject to the provisions of Section 305 of the National Aeronautics and Space Act of 1958, Public Law 85–568 (72. Stat. 435; 42 USC 2457).

This invention relates to an impact testing device.

More particularly this invention relates to an impact testing device which is compact and yet has the capability of imparting large impact forces on packages that have been accelerated to high velocities.

In many fields there is a need for impact test machines. In the field of aerospace engineering, interplanetary mission studies have shown that a need will exist for an impact test machine capable of simulating spacecraft planetary hard landings. When a spacecraft lands on a planet to perform subsequent experiments, it is necessary that the scientific payload be capable of withstanding the impact environment. In particular, if the spacecraft impacts the surface with a relatively high velocity, the scientific payload must be isolated in some manner to insure successful mission performance. The design of the spacecraft structure and scientific experiments is very difficult and is advancing the state of the art. Therefore, it is necessary that tests be performed to collaborate analytical techniques and qualify designs. In performing these tests, the conditions of planetary hard landing (velocity, impact angle, planetary surface characteristics) should be simulated as closely as possible.

Impact testing in prior art examples has failed to adequately fulfill the conditions of accurately simulating the impact of devices on the earth or other planetary bodies. One method in the past of testing impact on a package has been to drop the package from a building or the like. However, the impact is limited by the height to which the object is taken prior to drop and also the maximum terminal velocity an object can reach. Another method in the prior art by which impact can be transmitted to a device for measurment thereof is described in U.S. Patent No. 2,200,028 in which an inclined slide is used with a vehicle rolling thereon so that velocity is obtained and the impact can be measured at the bottom of the inclined slide. However, this device relies on gravity and of necessity occupies a great amount of space.

This invention obviates many of the problems encountered in the prior art examples by providing an impact testing device which occupies relatively little space while imparting high velocity to a package to be tested. Also, the test package is not overly constrained with respect to size. The device in its briefest aspects consists of a track along which the package to be tested is guided, with a pair of bow limbs on either side of the track to which is attached a bow line. A carriage in which the package is carried, is attached to the bow line. A source of power, such as an electrical winch, draws the bow line against the bias of the bow limbs. A quick release mechanism, when actuated releases the power source from the bow line so that the carriage is propelled toward an impact receiving surface. The package is hurled at high velocity against the impact receiving surface.

It is therefore an object of this invention to provide an improved impact testing device.

Another object of this invention is to provide an improved method of testing impact on packages or the like.

Other and more particular objects of this invention will become apparent as this description proceeds.

The drawing is a perspective view of the impact testing device according to this invention.

In the drawing, package 2 represents an object which is to be subjected to impact testing, and may consist of a scientific payload subsystem or an overall system on which it is desired to learn what effect impact has. A carriage 4 is guided along a guide track 6 and functions to hold the package 2, adapt it to the bow line 14 and 16, and to propel package 2 toward an impact receiving surface 8. This impact receiving surface can be varied by applying a variety of surfaces thereon to simulate any desired conditions. In addition, this surface may have varying shapes, and angle entries can be simulated by rotating surface 8 about pivot point 10. A damper or stop member 12 is provided close to the impact receiving surface 8 so that carriage 4 can be stopped to allow package 2 to be impacted against surface 8 in free flight without interference by carriage 4. Carriage 4 is releasably connected to bow line 14 and 16 each of which is attached at the other end thereof to bow members 18 and 20 respectively. These bow members can be comprised of a homogeneous, laminated, or sandwich construction to apply the bias to lines 14 and 16. Also, the bow limbs can be preloaded to yield a more efficient machine. It is preferable that in the unbiased position, bow members 18 and 20 are curved, with a constant radius of curvature, and when held back assume a straight position. The concave side of the unbiased bow limb faces generally forwardly toward the impact receiving surface. It is also preferable that the bow members 18 and 20 have a constant thickness and when in the straight position, the width vary as an isosceles triangle. That is, the outer free end of the limb forms the approximate apex of the triangle, the inner fixed end forms the base of the triangle, and the upper and lower edges of the limb form the equal sides of the triangle. These bow members are anchored in solid masses such as concrete pillars 22 and 24 as shown in the drawing. A bracing structure designated generally as 26 is utilized to help stablize the pillars.

Carriage 4 has associated therewith a quick release mechanism such as illustrated generally as 28 and may comprise any conventional quick release mechanism. For example, a quick release mechanism such as shown in U.S. Patent to Colby, No. 1,866,926 can be utilized. In any event the quick release mechanism forms no part of this invention. One end of cable or like device 30 is attached to the quick release mechanism, and the other end is connected with a winch or the like powered by any convenient motor source mounted within housing 32. Bow members 18 and 20 are attached to pillars 22 and 24 respectively in such a manner that they may be removed readily and different bow members substituted therefor. The surface of track or guide 6 can be coated with suitable substances to provide varying friction resistance. For example, these substances may comprise ice or Teflon or any other suitable material. In addition, guide or track member 6 can be elevated or lowered to accommodate different package sizes.

In operation, package 2 is placed in position on carriage 4 and the cable 30 winched to pull bow lines 14 and 16 against the bias of bow arms 18 and 20 toward housing 32. When a desired bias has been attained, the quick release mechanism 28 is activated to release cable 30 from carriage 4. The package and carriage will then be hurled at high velocity toward impact receiving surface 8. As the carriage strikes damper or stop member 12, the carriage will be halted and the package 2 hurled against the surface 8. Thus, the package impacts against the impact receiving surface in free flight simulating real conditions.

Thus it can be seen that by this invention there has been provided a relatively simple, compact and efficient mechanism which is capable of imparting a high velocity and free flight to a test package within a relatively short distance, and which is capable of accommodating test pacages of a variety of sizes.

Having described this invention, it is to be understood that it is to be limited only by the scope of the claim appended hereto.

What is claimed is:
1. A device for measuring impact stresses on a package which comprises:
   an impact receiving surface;
   a track adapted to direct a moving structure thereon toward said surface;
   biasing means adapted to project a package toward said surface, said biasing means comprising two bow limbs located opposite each other on opposite sides of said track, a carriage movably mounted on said track, said carriage being adapted to hold and propel a package, a bow string attached to said carriage and said carriage and said bow limbs;
   a power source adapted to draw said bow string, carriage and package against the bias of said bow limbs;
   a quick release connecting said bow string and said power source;
   whereby release of said quick release means will allow said carriage and said package to be accelerated toward said impact receiving surface along said track; and
   stop means to halt movement of said carriage short of said impact receiving surface.

References Cited
UNITED STATES PATENTS

| | | | |
|---|---|---|---|
| 2,185,091 | 12/1939 | Orlando et al. | 124—25 X |
| 2,526,369 | 10/1950 | Kiesel Horst | 124—23 |
| 2,740,286 | 4/1956 | DeVost et al. | 73—12 |
| 2,894,503 | 7/1959 | Pierson et al. | 124—24 X |

RICHARD C. QUEISSER, *Primary Examiner.*

JAMES H. WILLIAMSON, *Assistant Examiner.*